United States Patent
Colangelo

(10) Patent No.: US 9,984,115 B2
(45) Date of Patent: May 29, 2018

(54) MESSAGE AUGMENTATION SYSTEM AND METHOD

(71) Applicant: Patrick Colangelo, San Francisco, CA (US)

(72) Inventor: Patrick Colangelo, San Francisco, CA (US)

( * ) Notice: Subject to any disclaimer, the term of this patent is extended or adjusted under 35 U.S.C. 154(b) by 0 days. days.

(21) Appl. No.: 15/016,778

(22) Filed: Feb. 5, 2016

(65) Prior Publication Data

US 2017/0300527 A1    Oct. 19, 2017

(51) Int. Cl.
| | |
|---|---|
| *G06F 17/27* | (2006.01) |
| *H04L 12/58* | (2006.01) |
| *G06F 17/30* | (2006.01) |
| *G06F 3/0484* | (2013.01) |
| *G06Q 30/06* | (2012.01) |
| *G10L 15/26* | (2006.01) |
| *H04W 4/14* | (2009.01) |

(52) U.S. Cl.
CPC .... *G06F 17/30424* (2013.01); *G06F 3/04842* (2013.01); *G06F 17/2705* (2013.01); *G06F 17/30867* (2013.01); *G06Q 30/0641* (2013.01); *G10L 15/265* (2013.01); *H04L 51/10* (2013.01); *H04W 4/14* (2013.01)

(58) Field of Classification Search
CPC ............... G06Q 30/02; G06Q 30/0251; G06Q 30/0241; G06F 17/2785; G06F 17/27; H04L 51/04
See application file for complete search history.

(56) References Cited

U.S. PATENT DOCUMENTS

| | | | | |
|---|---|---|---|---|
| 7,673,083 | B2 * | 3/2010 | Laefer | G11B 19/02 345/169 |
| 8,694,611 | B1 * | 4/2014 | Bucher | G06F 17/3074 709/219 |
| 8,819,263 | B2 * | 8/2014 | Jarman | G06Q 30/0601 386/283 |
| 2003/0191689 | A1 * | 10/2003 | Bosarge | G06Q 30/02 705/14.35 |
| 2004/0034536 | A1 * | 2/2004 | Hughes | H04H 60/46 704/278 |

(Continued)

OTHER PUBLICATIONS

The Big Book of iTunes, [online], downloaded from http://makeuseof.com, published in 2009.*

*Primary Examiner* — Jialong He
(74) *Attorney, Agent, or Firm* — Quickpatents, LLC; Kevin Prince

(57) ABSTRACT

A messaging augmentation system comprises a message input module that receives a text, audio or video message from a user. A parsing module parses the message into at least one message fragment, a matching module compares each of the message fragments with a database of stored clips to identify matching clips, and a delivery module delivers the matching clips to the user to augment the message being sent to a recipient. Each stored clip includes an audio portion, and the clip database further includes, for each clip, caption data that includes text captions of the audio message, and corresponding file location data. Preferably the system is distributed over a network, such that the message input module is resident on a client device of the user, and the matching module is resident on a server.

17 Claims, 4 Drawing Sheets

(56) References Cited

U.S. PATENT DOCUMENTS

| | | | | |
|---|---|---|---|---|
| 2004/0054541 A1* | 3/2004 | Kryze | G06F 17/30026 |
| | | | | 704/275 |
| 2005/0010641 A1* | 1/2005 | Staack | G06Q 30/02 |
| | | | | 709/206 |
| 2006/0047580 A1* | 3/2006 | Saha | G06F 17/30746 |
| | | | | 705/26.62 |
| 2006/0242013 A1* | 10/2006 | Agarwal | G06Q 30/02 |
| | | | | 705/14.49 |
| 2007/0078708 A1* | 4/2007 | Yu | G06Q 30/02 |
| | | | | 705/14.69 |
| 2007/0078709 A1* | 4/2007 | Rajaram | G06Q 30/02 |
| | | | | 705/14.71 |
| 2007/0174258 A1* | 7/2007 | Jones | G06Q 30/02 |
| 2007/0198339 A1* | 8/2007 | Shen | G06Q 30/02 |
| | | | | 705/14.64 |
| 2008/0021878 A1* | 1/2008 | Jeong | G06F 17/30864 |
| 2008/0220797 A1* | 9/2008 | Meiby | G06Q 10/107 |
| | | | | 455/466 |
| 2008/0222687 A1* | 9/2008 | Edry | H04L 51/04 |
| | | | | 725/105 |
| 2008/0249986 A1* | 10/2008 | Clarke-Martin | G06Q 30/02 |
| 2008/0311934 A1* | 12/2008 | Soderstrom | G06Q 30/02 |
| | | | | 455/466 |
| 2009/0006375 A1* | 1/2009 | Lax | H04N 21/435 |
| 2009/0006396 A1* | 1/2009 | Dunlap | G06Q 30/02 |
| 2009/0011781 A1* | 1/2009 | Merrill | G06Q 30/02 |
| | | | | 455/466 |
| 2009/0055759 A1* | 2/2009 | Svendsen | G11B 27/00 |
| | | | | 715/764 |
| 2009/0076917 A1* | 3/2009 | Jablokov | G06Q 30/0239 |
| | | | | 705/14.39 |
| 2009/0150947 A1* | 6/2009 | Soderstrom | G06F 17/30817 |
| | | | | 725/93 |
| 2009/0216622 A1* | 8/2009 | Hoashi | G06F 17/30743 |
| | | | | 705/14.54 |
| 2009/0264105 A1* | 10/2009 | Iqram | H04L 12/1859 |
| | | | | 455/412.1 |
| 2009/0287650 A1* | 11/2009 | Cha | G06F 17/30749 |
| 2009/0307090 A1* | 12/2009 | Gupta | G06Q 30/02 |
| | | | | 705/14.58 |
| 2009/0312040 A1* | 12/2009 | Gupta | G06Q 30/02 |
| | | | | 455/466 |
| 2010/0086107 A1* | 4/2010 | Tzruya | H04M 3/2281 |
| | | | | 379/88.01 |
| 2010/0223279 A1* | 9/2010 | Scott | G06Q 30/02 |
| | | | | 707/769 |
| 2010/0299140 A1* | 11/2010 | Witbrock | G06Q 10/10 |
| | | | | 704/9 |
| 2011/0320273 A1* | 12/2011 | Miranda-Steiner | G06Q 30/02 |
| | | | | 705/14.49 |
| 2012/0290392 A1* | 11/2012 | Joshi | G06Q 30/02 |
| | | | | 705/14.53 |
| 2014/0122258 A1* | 5/2014 | Sharp | G06Q 30/0277 |
| | | | | 705/14.73 |
| 2015/0039549 A1* | 2/2015 | Aufmann | G06F 17/3053 |
| | | | | 706/46 |
| 2015/0287107 A1* | 10/2015 | Alakoye | G06Q 30/0277 |
| | | | | 705/14.73 |
| 2016/0042064 A1* | 2/2016 | Beaumier | G06F 3/041 |
| | | | | 715/716 |
| 2017/0147202 A1* | 5/2017 | Donohue | G06F 3/04886 |
| 2017/0242886 A1* | 8/2017 | Jolley | G06F 17/30401 |

* cited by examiner

| Record | Phrase | Clip Type | Track | Album | Artist | Caption | File | Start Time | End Time | Buy Link | Popularity |
|---|---|---|---|---|---|---|---|---|---|---|---|
| 13403 | Hello | Album | Hello | 25 | Adele | Hello | Adele-25-H | 0:0625 | 0:0703 | itunes.apple.com/us/album/25/id1051394208 | 10 |
| 13404 | Hello, it's me | Album | Hello | 25 | Adele | Hello, it's me | Adele-25-H | 0:0625 | 0:0107 | itunes.apple.com/us/album/25/id1051394208 | 3 |
| 13405 | Hello, can you Hear me | Album | Hello | 25 | Adele | Hello, can you Hear me | Adele-25-H | 0:3175 | 0:3618 | itunes.apple.com/us/album/25/id1051394208 | 2 |
| 13447 | Hello | Album | Hello | Can't Slow | Lionel Rich | Hello | Lionel.Rich | 0:3644 | 0:3801 | www.amazon.com/Cant-Slow-Down-Lionel-Richie/dp/B00... | 7 |
| 13448 | Hello, is it me You're Looking for | Album | Hello | Can't Slow | Lionel Rich | Hello, is it me You're Looking for | Lionel.Rich | 0:3644 | 0:3801 | www.amazon.com/Cant-Slow-Down-Lionel-Richie/dp/B00... | 2 |
| 13518 | Hello | YouTube Vid | Hello Again | | The Cars | Hello | KXpJ0bM5 | 0:3714 | 0:3788 | | 8 |
| 13519 | Hello, Hello Again | YouTube Vid | Hello Again | | The Cars | Hello, Hello Again | KXpJ0bM5 | 0:3714 | 0:3788 | | 7 |

FIG. 5

MESSAGE AUGMENTATION SYSTEM AND METHOD

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to electronic messaging, and more particularly to a method of adding popular audio or video clips to electronic messages.

DISCUSSION OF RELATED ART

There are currently a wide variety of ways to sends messages from one person to another person, some of the more common being email, text (SMS) messages, chat session messages, social media messages, and the like. Typically most such messages are text, but there are some video and audio messaging options available today as well, such as through Skype and other video-based services.

Elements of popular culture include songs, artists, movies, internet videos, and the like. Often portions of messages sent from one person to another include words or phrases that match some of these popular culture elements. For example, if a text message starts with the word "hello," there are quite a few songs performed by popular artists that are titled "Hello" or that include the word "hello" within the song. As such, it would be possible to augment such a text message with a popular artist singing that word or message fragment. Currently there is nothing available in the market to accomplish this.

Therefore, there is a need for a system that allows a user to augment a message or part of a message with popular cultural elements. Such a needed invention would allow the user to select one matching audio clip if more than one match is available, and would allow for real-time searching of a clip database as the user is typing or recording the message. Such a needed system could be distributed over a wide area network, or could be resident within a person's smart phone or other electronic device. The present invention accomplishes these objectives.

SUMMARY OF THE INVENTION

The present device is a messaging augmentation system for augmenting a message, such as a text message, an audio message, or a video message that includes audio, produced by a user. The message may be a text message sent through a chat application, an email message sent through an email messaging system, a text message sent through an SMS text messaging system, or the like.

The system comprises a message input module adapted to receive the message from the user. A parsing module is adapted to divide or parse the message into at least one message fragment. If the message is audio or video, a speech recognition module may be included to convert the audio message or the audio portion of the video message into a text transcription, and the text transcription is then sent as the text message. Each message fragment may be any number of words, such as one, two or more.

A matching module is adapted to compare each message fragment with a database of stored clips to identify matching clips to each message fragment, and a delivery module is adapted to deliver any matching clips to the user to augment the message. Each stored clip includes an audio portion, and the clip database further includes, for each clip, caption data that includes text captions of the audio message, and corresponding file location data. In the event more than one audio clip matches the message fragment, the matching module is further adapted to provide a selection interface to the user, wherein the user selects one of the identified matching clips for delivery by the delivery module.

The user may select to have the multiple matching clips that are displayed in the selection interface sorted in order of general popularity, or by his selected favorite artists, or even his previously uploaded clips. In such an embodiment of the invention, a clip upload module is further included for uploading clips of the user to the clip database. Each user clip includes the caption data that includes the text captions of the audio of the user clip and corresponding file location data, as with the other clips in the database. Each user is only provided access to user clips originating with the user, and preferably not any other user's user-uploaded clips.

Preferably the settings module is specific to each user, wherein the clip database may be further selectively filtered on a user's preferences such as favorite clip artist, larger work, song or track, movie, show, performer, or popularity of each clip or larger work. So, for example, all clips returned for a particular message may be of the same artist, if desired.

Preferably the system is distributed over a network, such as the Internet, a cellular phone network, or the like. As such, the message input module may be resident in a memory module of a client device of the user, such as a portable or desktop computer, smart phone, or the like. The client device is in communication with the network, either wirelessly or through a wired network connection.

The matching module, in such an embodiment, is resident on a server in communication with the network, and the parsing module may be resident on either the client device or the server, depending on the available bandwidth of the network and the computing power of the client device. The message or message fragments are sent from the client device through the network to the server. Once matched with clips in the database, the matching clips are returned to the client device through the network from the server.

In use, the user initiates the messaging augmentation system in his client device and, with the message input module, enters, speaks, or records the message to send to a remote user. The message input module may be incorporated into another chat, video conferencing, phone, or other application running on the client device. Alternately, the input module may be called as an API routine from a website application, or the like.

Each message fragment is compared with the database of clips for matches, and if more than one clip matches any particular message fragment the user is offered the selection interface to choose which clip he prefers to use. Once all clips are matched and selected, the delivery module delivers each clip back to the user and the user's client device. The clip or clips may then be sent along with the message to the recipient, the clips either playing immediately upon receipt or viewing, or presented as a link which, when selected, will play each clip on the recipient's electronic device and optionally display the entire message.

Based on the user's preferences, each returned clip may be from the same artist, or specifically from different artists, or artists sharing the same genre or style of music. The user has the choice of having the entire message represented by clips, provided that each message fragment within the message is matched to at least one clip, or the user can have only certain of the message fragments represented with a clip. In one embodiment, the entire conversation comprising multiple back-and-forth messages may be parsed, uploaded to the server, and the resulting clips delivered represent the entire conversation as a mash-up of multiple clips.

The present invention is a system that allows a user to augment a message or part of a message with popular cultural elements. The present system allows the user to select one matching audio clip if more than one match is available, and allows for real-time searching of a clip database as the user is typing or otherwise preparing the message. The present invention can be distributed over a wide area network, or can be resident within a person's smart phone or other electronic device. Other features and advantages of the present invention will become apparent from the following more detailed description, taken in conjunction with the accompanying drawings, which illustrate, by way of example, the principles of the invention.

DESCRIPTION OF THE DRAWINGS

FIG. 5 is a sample of a plurality of database records of the invention; and

DETAILED DESCRIPTION OF THE PREFERRED EMBODIMENT

Figure 1:
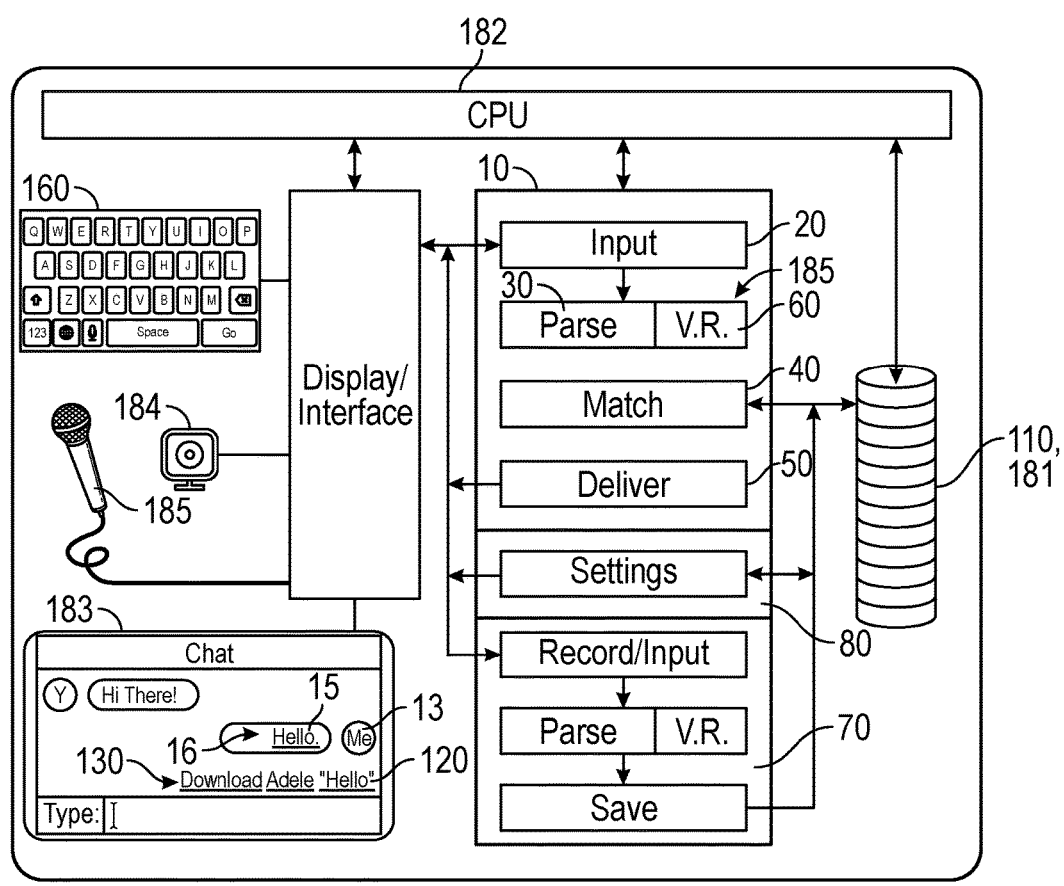
FIG. 1 is a diagram of the invention as embodied in a single electronic processing device.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1 and 3-5 illustrate a messaging augmentation system 10 for augmenting a message 15 produced by a user 13, such as a text message 16, an audio message 17, or a video message 18 that includes audio. The message 15 may be a text message 16 sent through a chat application, an email message sent through an email messaging system, a text message sent through an SMS text messaging system, or the like.

The system 10 comprises a message input module 20 adapted to receive the message 15 from the user 13. Such a message input module 20 may be included within a keyboard application 160, a chat application, a video messaging or video call application or website, an email application, or the like. Accordingly, the text message 16 may be embodied in any useful text format, such as .TXT, SMS or similar text-based formats. Likewise, the audio message 17 may be embodied within any audio format such as .mp3, .wav, .wmp or the like. With video messages 18, the audio portion of the video message 18 may be embedded within an .mp4, .mov or similar video format.

A parsing module 30 is adapted to divide or parse the message 15 into at least one message fragment 100. If the message 15 is the audio message 17 or the video message 18, a speech recognition module 60 may be included to convert the audio message 17 or the audio portion of the video message 18 into a text transcription, and the text transcription is then used as the text message 16 and parsed. Each message fragment 100 may be any number of words, such as 1, 2, 3 or more. Alternately, each message fragment 100 may be a single phrase, or an entire sentence. A settings module 80 is included in the system 10 that controls how long each message fragment 100 is, or how the message fragments 100 are to be determined based on grammatical rules or the like.

A matching module 40 is adapted to compare each message fragment 100 with a database 110 of stored clips 120 to identify matching clips 120 to each message fragment 100, and a delivery module 50 is adapted to deliver any matching clips 120 to the user 13 to augment the message 15. Each stored clip 120 includes an audio portion, and the clip database 110 further includes, for each clip 120, caption data 122 that includes text captions 124 of the audio message, and corresponding file location data 126.

For example, if the audio clip is of the word "hello" taken from a popular larger audio or video work 19, the text caption 124 is just the word "hello" and file location data 126 of the start and stop points of that word within the larger work 19. Such file location data 126 may be based on timestamp data 128, frame numbers (not shown), or other means for identifying the start and stop points of the clip 120 within the audio or video file comprising the larger audio or video work 19. A buy-now link 130 may also be included for providing the user 13 or his message recipient the opportunity to purchase the larger work 19.

In the event that a message fragment 100 does not have an exact match in the database 110, but matches a portion of a clip 120, speech recognition may be utilized to isolate the portion of the clip 120 that contains the message fragment 100. This can be accomplished through audio recognition, word courting, syllable counting, or through image recognition of the sound waves of the lyric line mapped visually and spikes in utterances mapped to the caption 124 to determine a start and stop time for the message fragment 100.

In the event more than one audio clip 120 matches the message fragment 100, the matching module 40 is further adapted to provide a selection interface 140 (FIG. 4) to the user 13, wherein the user 13 selects one of the identified matching clips 120 for delivery by the delivery module 40, such as by touching the display 183 of the client device 12. For example, the word "hello" may be used several times within the same song or larger work 19, but may be vocalized with different emphases or styles. Likewise, many songs may include the word "hello" and, therefore, based on a sorting preferences stored within the settings module 80, each matched clip 120 of the word "hello" is sorted differently in the selection interface 140. If, for example, the user 13 does not like the rap music style, he may deselect that style in his list of preferences 150 so that clips 120 matching undesired styles, or artists, are not presented as choices.

The user 13 may select to have the multiple matching clips 120 that are displayed in the selection interface 140 sorted in order of general popularity, or by his selected favorite artists 132, or even his previously uploaded clips 120. In such an embodiment of the invention, a clip upload module 70 is further included for uploading clips 120 of the user 13 to the clip database 110. Each user clip 120 includes the caption data 122 that includes the text captions 124 of the audio of the user clip 120 and corresponding file location data 126, as with the other clips 120 in the database 110. Each user 13 only has access to his uploaded user clips 120, and preferably not access to those of other users 13. The settings module 80 is specific to each user 13, wherein the clip database 110 may be further selectively filtered on a user's preferences 150 such as favorite clip artist 132, larger work 19, song or track 133, movie, show, performer, or popularity 134 of each clip 120 or larger work 19.

Figure 2:
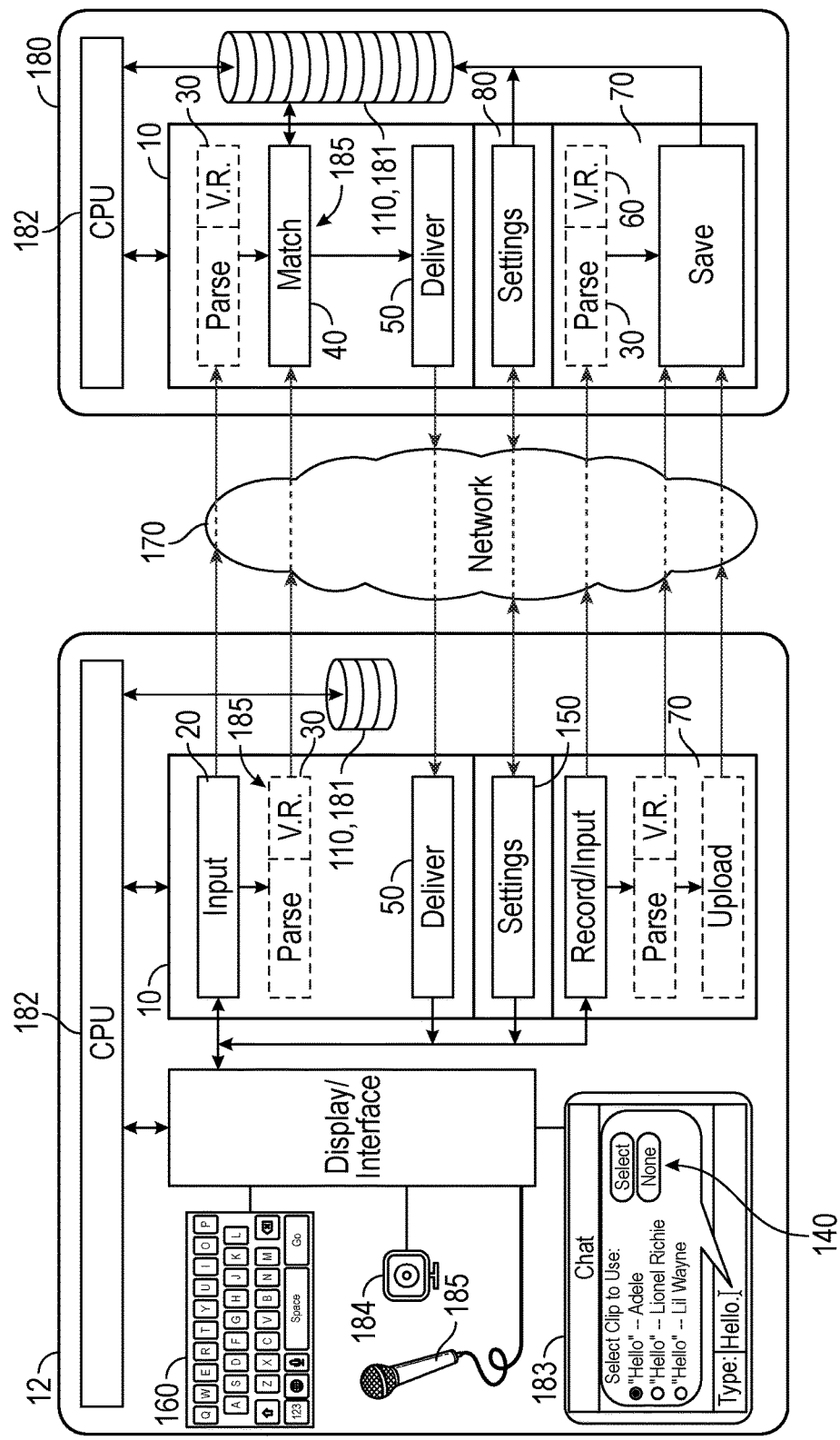
FIG. 2 is a diagram of the invention as embodied with certain functions distributed over a network between a client electronic device and a server.
Figure 3:
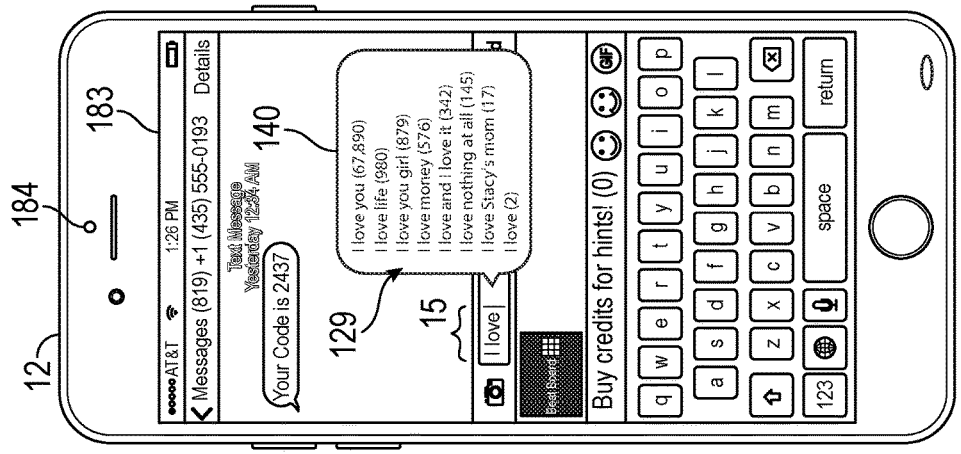
FIG. 3 is a sample display screen of the client device.
Figure 4:
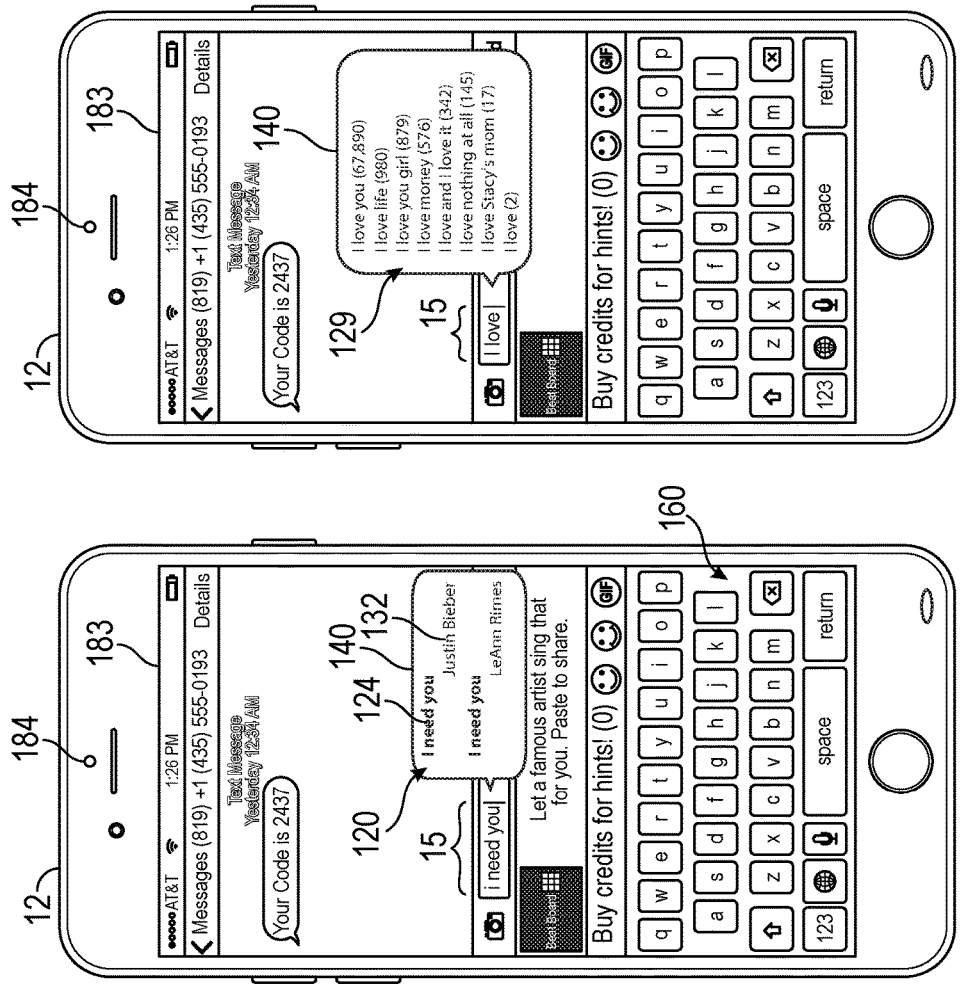
FIG. 4 is an alternate sample display screen of the client device.

Preferably the system 10 is distributed over a network 170 (FIG. 2), such as the Internet, a cellular phone network, or the like. As such, the message input module 20 may be resident on a client device 12 of the user 13, such as a portable or desktop computer, smart phone, or the like that includes at least one processor 182, a non-transitory computer-readable storage medium 181 for storing a set of instructions 185 that embody the system 10 and the modules thereof, a display 183, and preferably both a camera 184 and a microphone 185.

The client device 12 is in communication with the network 170, either wirelessly or by wired network connection. The matching module 40, in such an embodiment, is resident on a server 180 in communication with the network 170, and the parsing module 30 may be resident on either the client device 12 or the server 180, depending on the available bandwidth of the network 170 and the computing power of the client device 12. The message 15 or message fragments 100 are sent from the client device 12 through the network 170 to the server 180. Once matched with clips 120 in the database, the matching clips 120 are returned to the client device 12 through the network 170 from the server 180. Such a server 180 preferably includes at least one processor 182 and a non-transitory computer-readable storage medium 181, such as RAM or ROM that retains a set of instructions 185 that enable the system 10 and the modules thereof.

In use, the user 13 initiates the messaging augmentation system 10 in his client device 12 and, with the message input module 20, enters, speaks, or records the message 15 to send to a remote user (not shown). The message input module 20 may be incorporated into another chat, video conferencing, phone, or other application running on the client device 12. Alternately, the input module 20 may be called as an API routine from a website application, or the like.

Preferably the message 15 is then sent to the server 180 through the network 170 where the parsing module 30 divides the message into at least one message fragment 100. Alternately, the parsing module 30 is resident on the client device 12 and each message fragment 100 is sent through the network 170 to the server 180 and the matching module 40. If the message 15 is in an audio or video format, the audio portion is converted to the text message 16 with the speech recognition module 60, which is resident on either the client device 12 or on the server 180, and such a text message 16 is parsed into at least one message fragment and sent to the matching module 40.

Each message fragment 100 is compared with the database 110 of clips 120 for matches, and if more than one clip 120 matches any particular message fragment 100 the user 13 is offered the selection interface 140 to choose which clip 120 he prefers to use. Once all clips 120 are matched and selected, the delivery module 50 delivers each clip 120 back to the user 13 and the user's client device 12. At any time the user 13 preferably has the option to play each returned clip 120 to verify suitability, and reject any clip 120 that is not desired. The final set of chosen clips 120 are then sent along with the message 15 to the recipient, the clips 120 either playing immediately upon receipt or viewing, or presented as a link which, when selected, will play each clip 120 on the recipient's electronic device (not shown) and optionally display or play the original message 15.

Based on the user's preferences 150, each returned clip 120 may be from the same artist 132, or specifically from different artists 132, or artists 132 sharing the same genre or style of music (for example, rap or country). The user 13 has the choice of having the entire message 15 represented by clips 120, provided that each message fragment 100 within the message 15 is matched to at least one clip 120, or the user can have only certain of the message fragments 100 represented with a clip 120. In one embodiment, the entire conversation comprising multiple back-and-forth messages 15 may be parsed, uploaded to the server 180, and the resulting clips 120 delivered represent the entire conversation as a mash-up of multiple clips 120. One side of such a conversation may comprise clips 120 from one artist, while the other side of the conversation may comprise clips 120 entirely from another artist, if desired. For example, one side of the conversation from the user 13 may be entirely sung by Bono from the rock band U2, while the other side of the conversation from the recipient may be sung by the artist Beyoncé.

Figure 6:
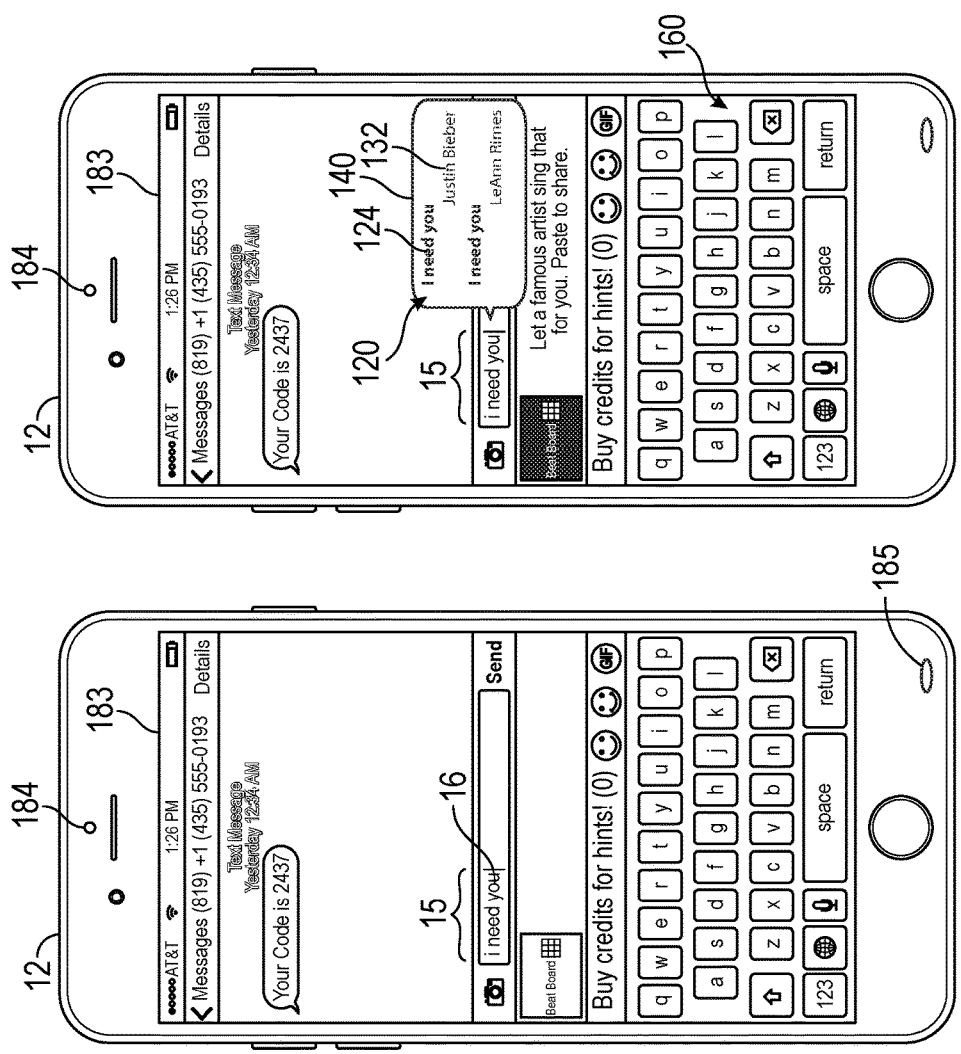
FIG. 6 is an alternate sample display screen of the client device, illustrating a selection interface for matching clips.

Preferably as a user is typing or otherwise generating the message 15, the parsing module 30 is working to determine suitable message fragments 100 of the message 15 and sending these message fragments 100 to the matching module 40. The matching module 40 is quickly comparing the received message fragments 100 and returning suitable matched clips 120, such that the experience of the user 13 is that the suggestions of matching clips 120 are displayed in essentially real-time as the user 13 types (FIGS. 3 and 4) or speaks the message 15. In one embodiment having an auto-complete feature (FIG. 6), the most popular clips 120 that match the message 15 are displayed along with anticipated clips 129 that may be selected to automatically complete what the complete message 15 might be. Preferably these anticipated clips 129 are sorted on the selection interface 140 by popularity.

While a particular form of the invention has been illustrated and described, it will be apparent that various modifications can be made without departing from the spirit and scope of the invention. For example, the clips 120 are disclosed above as having at least an audio portion, but may be purely video, still images, or the like. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A messaging augmentation system comprising:
   a message input module adapted to receive a message from a first user for delivery to a second user;
   a parsing module adapted to divide the message into at least one message fragment;
   a matching module adapted to compare each of the at least one message fragment with clips stored in a database to identify matching clips to the at least one message fragment, wherein the stored clips in the database are elements of popular culture;
   a delivery module adapted to deliver the matching clips to the first user to augment the message;
   the matching module is further adapted to provide a selection interface to the first user upon the matching module identifying more than one of the matching clips for any of the at least one matching message fragment, whereby the user selects one of the matching clips for delivery by the delivery module;
   a settings module specific to each user, wherein the clip database is further selectively filtered on a user's preference for favorite clip artists, larger works, songs, movies, shows, performers, or the popularity of each clip or larger work; and
   the messaging augmentation system sends the message along with a selected one of the matching clips to the second user, wherein
   the database includes, for any clip that is taken from a larger audio or video work, a buy-now link to an online store for purchasing the larger audio or video work, and wherein the delivery module is further adapted to send the buy-now link to the second user.

2. The messaging augmentation system of claim 1 wherein the message is a text message, the parsing module being adapted to divide the message into at least one text message fragment.

3. The messaging augmentation system of claim 1 wherein the message includes an audio message, the parsing module including a speech recognition module to convert the audio message into a text message.

4. The messaging augmentation system of claim 1 wherein each stored clip includes an audio message, and wherein the clip database further includes, for each clip, caption data that includes text captions of the audio message and corresponding file location data.

5. The message augmentation system of claim 4 wherein the file location data includes timestamp data.

6. The message augmentation system of claim 1 further including a clip upload module adapted to upload clips of the first user to the clip database, each user clip including the caption data that includes text captions of the audio of the user clip and corresponding file location data.

7. The message augmentation system of claim 1 wherein the message input module is incorporated into a keyboard application.

8. The message augmentation system of claim 1 further including a wireless network, and wherein the message input module is resident on a portable electronic device of the first user and in communication with the network, and wherein the matching module is resident on a server in communication with the network, whereby the message or the at least one message fragment is sent from the portable electronic device through the network to the server, and whereby the matching clips are delivered from the server through the network to the first user's portable electronic device.

9. A processor-implemented method for augmenting a message of a first user, comprising the steps:
   providing a messaging augmentation system comprising a message input module adapted to receive a message from first user; a parsing module adapted to divide the message into at least one message fragment; a matching module adapted to compare each of the at least one message fragment with clips stored in a database to identify matching clips to the at least one message fragment; a settings module specific to each user, wherein the clip database is further selectively filtered on a user's preference for favorite clip artists, larger works, songs, movies, shows, performers, or the popularity of each clip or larger work; and a delivery module adapted to deliver any matching clips to the user to augment the message;

receiving the message from the first user via the message input module, the message configured for delivery to a second user;

dividing the message into at least one message fragment via the parsing module;

comparing, by the matching module, each of the at least one message fragment with stored clips in the database to identify matching clips to the at least one message fragment, wherein the stored clips in the database are elements of popular culture;

delivering, by the delivery module, the matching clips to the first user to augment the message;

providing, by the matching module, a selection interface to the user upon the matching module identifying more than one of the matching clips for any of the at least one matching message fragment;

waiting for the first user to select one of the matching clips for delivery by the delivery module; and sending the message of the first user, with a selected one of the matching clips, to the second user, wherein the database includes, for any clip that is taken from a larger audio or video work, a buy-now link to an online store for purchasing the larger audio or video work, and wherein the delivery module is further adapted to send the buy-now link to the second user.

10. The method of claim 9 further including the steps:

providing a speech recognition module to convert an audio message into a text message; and the parsing module utilizing the speech recognition module to convert any audio portion of the message into a text message.

11. The method of claim 9 further including the step:

sorting the more than one matching clip based on a user's preference for favorite clip artists, larger works, songs, movies, shows, performers, or the popularity of each clip or larger work.

12. The method of claim 9 further including the steps:

providing a wireless network, wherein the message input module is resident on a portable electronic device of the first user and in communication with the network, and wherein the matching module is resident on a server in communication with the network;

the message input module sending the message through the network to the server; and the delivery module delivering any of the matching clips to the first user through the network.

13. A non-transitory computer-readable storage medium storing a set of instructions that, when executed by at least one processor, cause the processor to perform operations, comprising:

receiving a message from a first user to be delivered to a second user;

parsing the message into at least one message fragment;

comparing each of the at least one message fragment with clips stored in a database to identify matching clips to the at least one message fragment, wherein the stored clips in the database are elements of popular culture;

delivering the matching clips to the first user to augment the message;

providing a selection interface to the first user upon identifying more than one matching clip for any of the at least one matching message fragment;

waiting for the first user to select one of the identified matching clips for delivery;

the clip database further selectively filtering on a user's preference for favorite clip artists, larger works, songs, movies, shows, performers, or the popularity of each clip or larger work; and delivering the message, with a selected matching clip, to the second user, wherein the database includes, for any clip that is taken from a larger audio or video work, a buy-now link to an online store for purchasing the larger audio or video work, and wherein the delivery module is further adapted to send the buy-now link to the second user.

14. The method of claim 13 further including the step:

performing speech recognition on the message to convert any audio portion of the message into a text message.

15. The method of claim 13 further including the step:

sorting the more than one matching clip based on a user's preference for favorite clip artists, larger works, songs, movies, shows, performers, or the popularity of each clip or larger work.

16. The method of claim 13 further including the steps:

sending the message through a network to a server;

delivering any of the matching clips to the first user through the network.

17. The method of claim 13 further including the steps:

comparing each of the at least one message fragment with a database of stored clips to identify matching clips and anticipated clips to the at least one message fragment;

providing a selection interface to the first user upon identifying more than one matching clip and anticipated clips for any of the at least one message fragment; and waiting for the first user to select one of the identified matching clips or anticipated clips for delivery.

\* \* \* \* \*